US012649319B2

(12) United States Patent
Yourlo et al.

(10) Patent No.: US 12,649,319 B2
(45) Date of Patent: Jun. 9, 2026

(54) INK DELIVERY SYSTEM WITH FILTER PROTECTION

(71) Applicant: Memjet Technology Limited, Dublin (IE)

(72) Inventors: Zhenya Yourlo, North Ryde (AU); Peter Crichton, North Ryde (AU); Mel Wang, North Ryde (AU); Nicholas Chin, North Ryde (AU); Craig Meyer, North Ryde (AU)

(73) Assignee: Memjet Technology Limited, Dublin (IE)

( * ) Notice: Subject to any disclaimer, the term of this patent is extended or adjusted under 35 U.S.C. 154(b) by 539 days.

(21) Appl. No.: 18/308,971

(22) Filed: Apr. 28, 2023

(65) Prior Publication Data

US 2023/0391104 A1 Dec. 7, 2023

Related U.S. Application Data

(60) Provisional application No. 63/348,448, filed on Jun. 2, 2022.

(51) Int. Cl.

| | |
|---|---|
| ***B41J 2/19*** | (2006.01) |
| ***B41J 2/175*** | (2006.01) |
| ***B41J 2/18*** | (2006.01) |

(52) U.S. Cl.
CPC ............ *B41J 2/19* (2013.01); *B41J 2/17563* (2013.01); *B41J 2/18* (2013.01)

(58) Field of Classification Search
CPC ... B41J 2/19; B41J 2/17563; B41J 2/18; B41J 2/175; B41J 2/17596
See application file for complete search history.

(56) References Cited

U.S. PATENT DOCUMENTS 8,926,077 B2 * 1/2015 LaCaze ................ B41J 2/17596 347/89
10,369,802 B2 * 8/2019 McAuliffe .............. B41J 2/175

* cited by examiner

*Primary Examiner* — An H Do
(74) *Attorney, Agent, or Firm* — Garson & Gutierrez, PC

(57) ABSTRACT

An ink delivery system for delivering ink to an inkjet printhead includes: an ink tank; the inkjet printhead having a printhead inlet port and a printhead outlet port; an ink supply line connected between the ink tank and the printhead inlet port; an ink return line connected between the ink tank and the printhead outlet port; an ink recirculation pump positioned in the ink return line; an ink filter positioned in the ink return line; a bypass line for bypassing ink around the ink filter; a bypass valves for controlling flow of ink either through the ink filter or through the bypass line; and a controller for coordinating the bypass valve and the pump. The controller is configured to pump ink from the printhead outlet port to the ink tank via the bypass line when the return line contains air.

12 Claims, 3 Drawing Sheets

INK DELIVERY SYSTEM WITH FILTER PROTECTION

CROSS-REFERENCE TO RELATED APPLICATIONS

The present application claims the benefit of priority under 35 U.S.C. § 119(e) of U.S. Provisional Application No. 63/348,448, entitled INK DELIVERY SYSTEM WITH FILTER PROTECTION, filed Jun. 2, 2022, the contents of which are hereby incorporated by reference in their entirety for all purposes.

The present application is related to U.S. application Ser. No. 18/309,004, filed Apr. 28, 2023, entitled INKJET MODULE WITH PRINTHEAD NEST ASSEMBLY and U.S. application Ser. No. 18/309,328, filed Apr. 28, 2023, entitled PRINTING UNIT WITH TANDEM INKJET MODULES, the contents of which is hereby incorporated by reference in its entirety for all purposes.

FIELD OF THE INVENTION

This invention relates to an ink delivery system for an inkjet printer or other inkjet printing device. It has been developed primarily for protecting an ink filter in the ink delivery system.

BACKGROUND OF THE INVENTION

Inkjet printers employing Memjet® technology are commercially available for several different printing formats, including small-office-home-office ("SOHO") printers, label printers, digital inkjet presses and wide format printers. Memjet® printers typically comprise one or more stationary inkjet printheads, which are user-replaceable, configured for single-pass printing. For example, a desktop printer may comprise a single user-replaceable multi-colored or monochrome printhead, a high-speed digital press may comprise a plurality of user-replaceable monochrome printheads aligned along a media feed direction, and a wide format printer may comprise a plurality of user-replaceable printheads in a staggered overlapping arrangement so as to span across a wide format page width.

Ink is supplied to an inkjet printhead via an ink delivery system, which is designed primarily for delivering ink to the printhead at a predetermined hydrostatic pressure. Ink delivery systems also typically include an ink filter for filtering particulates from the ink.

Air bubbles are a perennial problem in inkjet printers. Air bubbles that reach inkjet nozzles can block nozzles and cause catastrophic deprime events. Air bubbles can also reduce the efficacy of ink filters in the ink delivery system by blocking microscopic pores in the filter material. Furthermore, air that overcomes the bubble point pressure of an ink filter generates a large amount of undesirable foam, which needs to be managed.

To some extent, the problems associated with air bubbles can be mitigated through the use of degassed ink in a closed ink delivery system. However, such ink delivery systems are not immune to the problems of air bubbles even when degassed ink is employed. For example, air may be intentionally introduced into the ink delivery system via printhead depriming operations when air is drawn through the printhead so that the printhead can be replaced. This introduced air can circulate around the ink delivery system and become trapped in the ink filter, thereby reducing the efficacy of the ink filter and adversely affecting print quality. If the ink filter becomes catastrophically blocked with air bubbles, it will require replacement, which is both inconvenient and time-consuming.

In some ink delivery systems described in the prior art, the ink filter is connected to a deaeration pump, which helps to remove air from a filter chamber housing the filter material.

U.S. Pat. No. 10,369,802 (the contents of which are incorporated herein by reference) describes an ink delivery system having a passively de-aerating ink filter.

Nevertheless, such prior art ink delivery systems are still prone to excessive foaming and filter blockages, especially during printhead depriming. It would therefore be desirable to provide an ink delivery system with improved bubble management and which, more particularly, minimizes problems associated with air bubbles in ink filters.

SUMMARY OF THE INVENTION

In a first aspect, there is provided an ink delivery system for delivering ink to an inkjet printhead, the ink delivery system comprising:

- an ink tank;
- the inkjet printhead having a printhead inlet port and a printhead outlet port;
- an ink supply line connected between the ink tank and the printhead inlet port;
- an ink return line connected between the ink tank and the printhead outlet port;
- an ink recirculation pump positioned in the ink return line;
- an ink filter positioned in the ink return line;
- a bypass line for bypassing ink around the ink filter;
- one or more bypass valves for controlling flow of ink either through the ink filter or through the bypass line; and
- a controller for coordinating said bypass valves and said pump, wherein the controller is configured to pump ink from the printhead outlet port to the ink tank via the bypass line when the return line contains air.

The ink delivery system according to the first aspect advantageously increases the lifetime of ink filters in printing systems. Ink filters are essential components of ink delivery systems and replacement of ink filters is expensive and inconvenient. Typically, ink filter replacements cannot be performed by users and require a service technician. By identifying, predicting and minimizing a primary source of filter blockages, the ink delivery system described herein requires fewer service interventions, whilst maintaining proper filtration for fluidic operations requiring ink filtering.

In a second aspect, there is provided a method of pumping ink in a printing system having an ink tank, a printhead, a pump and an ink filter, said method comprising the steps of:

- pumping ink through the ink filter only when the ink is substantially free of air; and
- pumping ink around the ink filter via a bypass line when the ink contains air.

As used herein, the term "ink" is taken to mean any printing fluid, which may be printed from an inkjet printhead. The ink may or may not contain a colorant. Accordingly, the term "ink" may include conventional dye-based or pigment based inks, infrared inks, fixatives (e.g. pre-coats and finishers), 3D printing fluids, functional fluid (e.g. solar inks, sensing inks etc) and the like.

As used herein, the term "printer" refers to any printing device or print module, such as a conventional desktop printer, label printer, duplicator, copier, digital inkjet press, 3D printer and the like.

BRIEF DESCRIPTION OF THE DRAWINGS

Embodiments of the present invention will now be described by way of example only with reference to the accompanying drawings, in which.

DETAILED DESCRIPTION OF THE INVENTION

Figure 1:
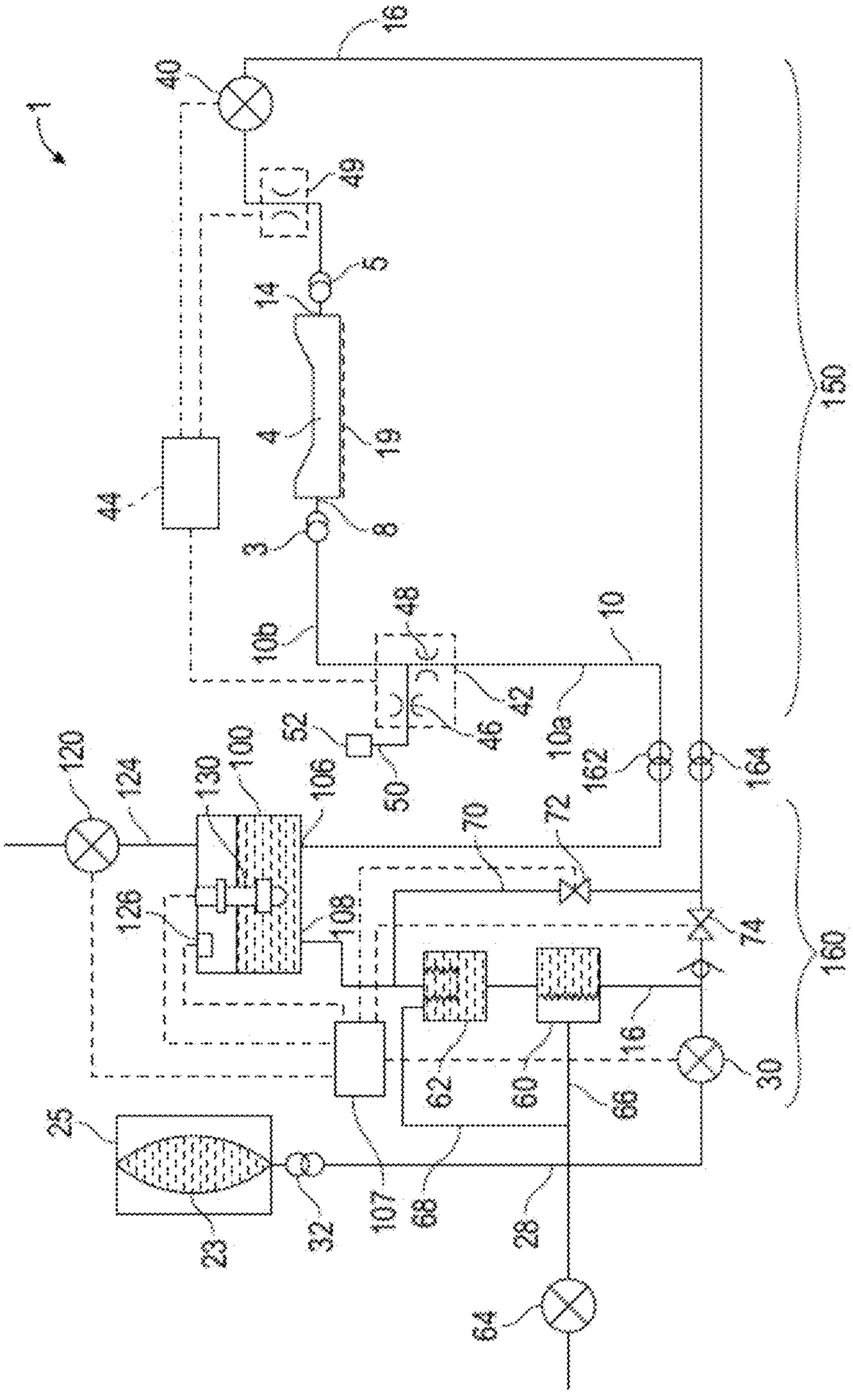
FIG. 1 shows schematically an ink delivery system according to the first aspect.

Referring to FIG. 1, there is shown schematically an ink delivery system 1 for delivering ink to a replaceable printhead 4. The ink delivery system 1 is configured for enabling normal printing at a regulated hydrostatic ink pressure and printhead depriming for printhead replacement, as well as ink recirculation for ink filtering and degassing.

The ink delivery system 1 comprises an intermediary ink tank 100 having an ink outlet port 106 connected to a printhead inlet port 8 of a printhead 4 via an ink supply line 10. An ink return port 108 of the intermediary ink tank 100 is connected to a printhead outlet port 14 of the printhead 4 via an ink return line 16. Hence, the intermediary ink tank 100, the ink supply line 10, the printhead 4 and the ink return line 16 define a closed fluidic loop. Typically, the ink supply line 10 and the ink return line 16 are comprised of lengths of flexible tubing, which may have the same or different cross-sectional areas, as described in US 2014/0015905, the contents of which are incorporated herein by reference.

The ink return line 16 contains an ink recirculation pump 40 downstream of the printhead outlet port 14, an ink degasser 60 downstream of the ink recirculation pump 40 and an ink filter 62 downstream of the ink degasser. The ink recirculation pump 40 serves to circulate ink around the closed fluidic loop, as will be explained below with reference to certain fluidic operations. The ink degasser 60 and ink filter 62 serve to degas and filter ink circulating around the closed fluidic loop as well as ink entering the closed fluidic loop from a bulk ink reservoir 25. The ink degasser 60 is connecting to a degassing line 66, while the ink filter 62 is connected to a deaeration line 68. The degassing line 66 and the deaeration line 68 are both connected to a common vacuum pump 64 for removing air from the ink degasser 60 and ink filter 62, respectively.

A bypass line 70 interconnects portions of the ink return line 16 upstream of the ink degasser 60 and downstream of the ink filter 62, thereby allowing ink to bypass the ink degasser and ink filter, as required. Flow of ink through the bypass line 70 is controlled by a first bypass valve 72 in the bypass line and a second bypass valve 74 in the ink return line 16. With the first bypass valve 72 closed and the second bypass valve 74 open, ink flows normally through the ink degasser 60 and ink filter 62 upon actuation of the ink recirculation pump 40. With the first bypass valve 72 open and the second bypass valve 74 closed, ink flows only through the bypass line 70 upon actuation of the ink recirculation pump 40, thereby bypassing the ink degasser 60 and ink filter 62. The first and second bypass valves 72 and 74 are controlled by a first controller 107, which coordinates operation of various components in the ink delivery system 1. Although first and second bypass valves 72 and 74 are exemplified in the ink delivery system 1, it will of course be appreciated that, alternatively, a single three-way valve (not shown) may be used for controlling a flow of ink through either the bypass line 70 or through the ink degasser 60 and ink filter 62 contained in the return line 16.

The printhead 4 is user-replaceable by means of a first printhead coupling 3 releasably interconnecting the printhead inlet port 8 and the first ink line 10; and a second printhead coupling 5 releasably interconnecting the printhead outlet port 14 and the second ink line 16. The printhead 4 is typically configured for single pass printing and may be, for example, a pagewide printhead as described in U.S. Pat. No. 10,293,609, the contents of which are incorporated herein by reference. For delivery of multiple inks to the printhead 4, it will be appreciated that multiple ink delivery systems 1 may be employed, each delivering a single ink color to the printhead. For the purposes of clarity, only one ink delivery system 1 for a single ink color is shown in FIG. 1.

Ink is supplied to the ink return port 108 of the intermediary ink tank 100 from a bulk ink reservoir 25 using a refill pump 30. The bulk ink reservoir 25 has a collapsible ink bag 23 containing ink, which is supplied to the ink return line 16 and, ultimately, the intermediary ink tank 100, via an ink refill line 28 containing the ink refill pump. The ink cartridge 25 is typically user-replaceable and connected to the ink refill line 28 via a suitable ink refill coupling 32. The ink refill line 28 may comprise an inline ink filter (not shown) for filtering ink before it reaches the ink return line 16.

The intermediary ink tank 100 is configured for supplying ink to the printhead 4 at a regulated negative hydrostatic pressure ("backpressure"). The printhead 4 operates optimally when the backpressure is within a relatively narrow range and the ink delivery system 1 is therefore required to deliver ink at this optimized backpressure. The intermediary ink tank 100 is a closed tank having a headspace connected to a reversible pressure-control pump 120 via a pressure-control line 124. The pressure-control pump 120 is operable either to decrease or increase air pressure in the headspace above a level of ink contained in the intermediary ink tank 100. The air pressure of the headspace is sensed using air pressure sensor 126, which provides feedback to the first controller 107 operably connected to the pressure-control pump 120.

The first controller 107 is also operably connected to the refill pump 30 and an ink level sensor 130 contained in the intermediary ink tank 100 in order to maintain a substantially constant level of ink inside the intermediary ink tank during printing. The refill pump 30 controls a flow of ink from the bulk ink reservoir 25 into the intermediary ink tank 100 and is operated under the control of the first controller 107, which receives feedback from the ink level sensor 130. When the level of ink falls below a predetermined 'low' level, the first controller 107 signals the refill pump 30 to pump ink into the ink return line 16 so as to increase the level of ink in the intermediary tank; and when the level of ink reaches a predetermined 'high' level, the first controller signals the refill pump 30 to cease pumping. In this way, the level of ink in the intermediary ink tank 100 may be maintained relatively constant.

The amount of backpressure experienced at a nozzle plate 19 of the printhead 4 is ultimately determined by the height (either above or below) of the nozzle plate relative to a level of ink 20 in the intermediary ink tank 100 and an air pressure in the headspace of the intermediary ink tank, as well as pressure drops across various components in the ink delivery system (e.g., ink filter, ink degasser, tubing etc.). Depending on the relative positioning of the intermediary ink tank 100 and the printhead 4, the air pressure inside the intermediary ink tank 100 that is required for delivering ink at the optimal backpressure is determined empirically during set up of a particular printing system. Once a suitable air pressure inside the intermediary ink tank 100 has been established by the pressure-control pump 120, then the ink delivery system 1 should require minimal pressure control from the pressure-control pump during printing, since the intermediary ink tank 100 is closed to atmosphere and ink is replenished via the ink refill pump 30 to maintain a relatively constant ink level therein.

Advantageously, the intermediary ink tank 100 may be positioned either above or below the printhead 4, which provides users with flexibility in the physical setup of a particular printing system, in contrast with gravity-feed ink delivery systems necessitating a predetermined height of the printhead above the ink tank.

The closed fluidic loop, incorporating the intermediary ink tank 100, the ink supply line the printhead 4 and the ink return line 16, facilitates priming, de-priming and other required fluidic operations of the ink delivery system 1. A second controller 44 is connected to the ink recirculation pump 40 and pinch valves to coordinate various fluidic operations for the printhead 4, as will be explained below. Typically, the second controller 44 also controls operation of a printhead capper and wiper (not shown in FIG. 1).

A three-way pinch valve arrangement 42 is contained in the ink supply line 10 and comprises an air pinch valve 46 and an upstream ink pinch valve 48. The pinch valve arrangement 42 may take the form of any of the pinch valve arrangements described in, for example, US 2011/0279566; US 2011/0279562; and U.S. Pat. No. 9,180,676, the contents of which are incorporated herein by reference.

The air pinch valve 46 controls a flow of air through an air intake line 50 branched from the ink supply line 10. The air intake line 50 terminates at an air filter 52, which is open to atmosphere and functions as an air intake for the closed fluidic loop. By virtue of the air intake line 50, the ink supply line 10 is divided into a first section 10*a* between the ink outlet port 106 and the air intake line 50, and a second section 10*b* between the printhead inlet port 8 and the air intake line 50.

The upstream ink pinch valve 48 controls a flow of ink through the first section 10*a* of the ink supply line 10, while a downstream ink pinch valve 49, positioned between the printhead outlet port 14 and the ink recirculation pump 40, controls a flow of ink through the return line 16.

Figure 3:
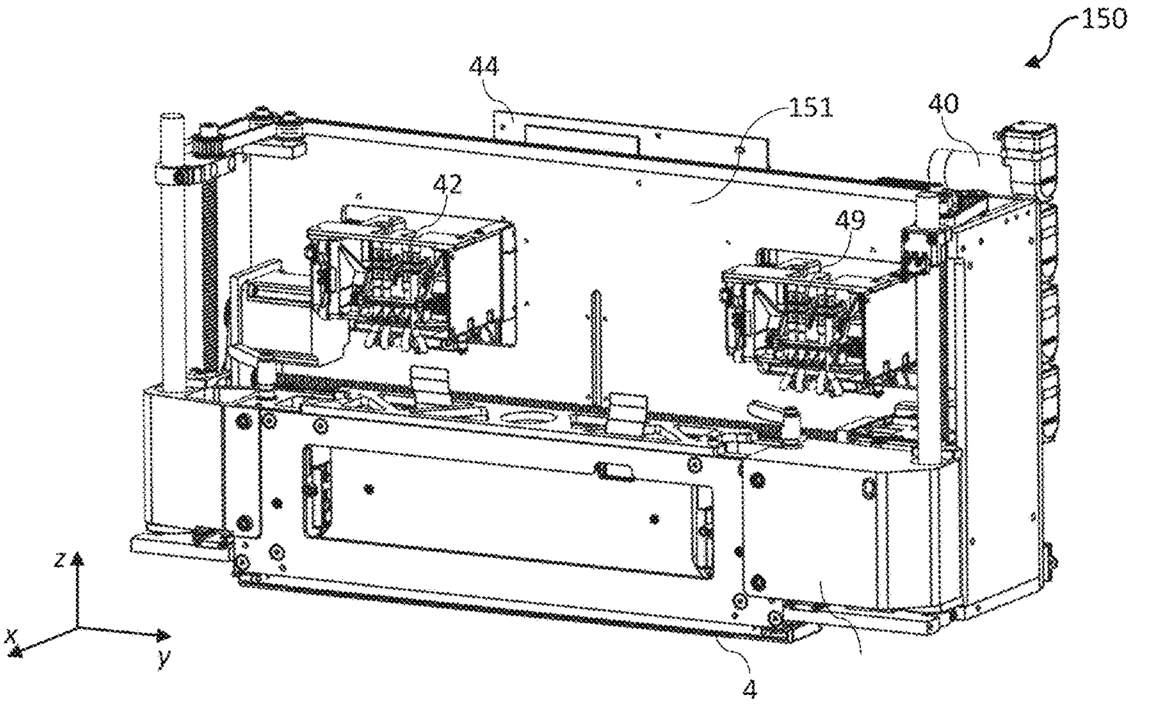
FIG. 3 is a front perspective view of an inkjet module.
Figure 4:
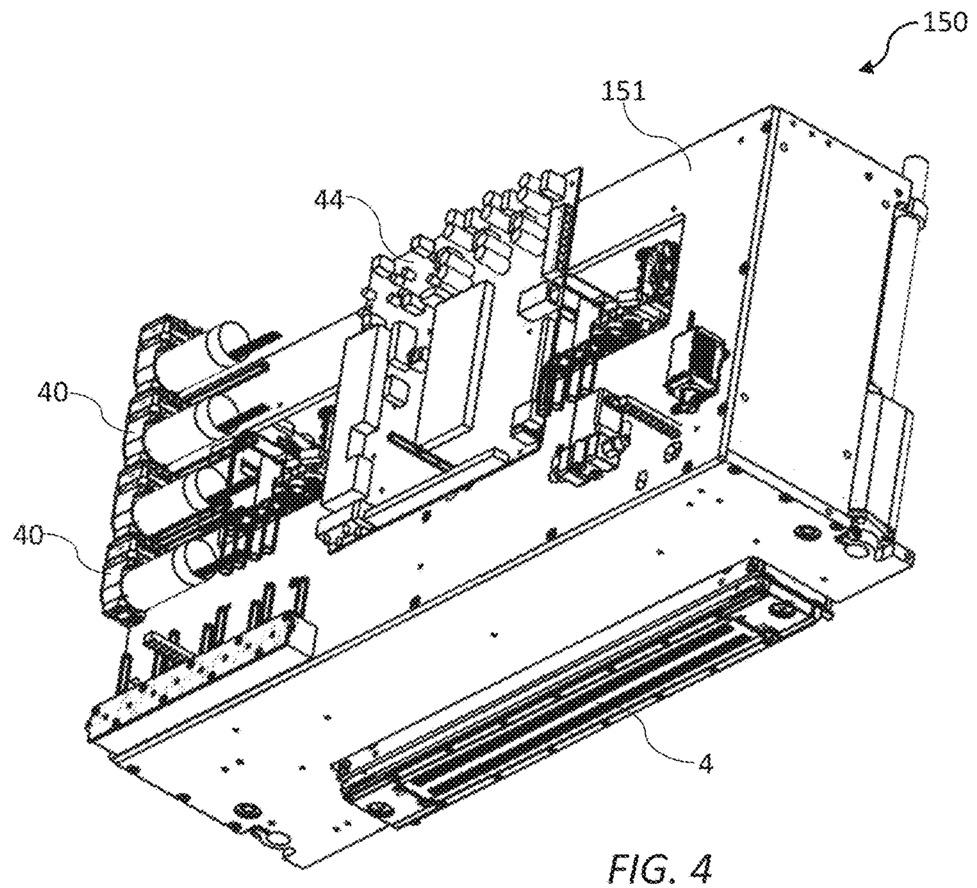
FIG. 4 is a rear perspective view of the inkjet module.

The printhead 4 is contained in an inkjet module 150, which includes the three-way pinch valve arrangement 42, the downstream ink pinch valve 49 and the ink recirculation pump as well as the second controller 44. As shown in FIGS. 3 and 4, the inkjet module 150 has multi-channel pinch valves 42 and 49 and multiple recirculation pumps 40 for handling multiple inks in the printhead 4 having two rows of butting print chips. The three-way pinch valve arrangement 42 (incorporating the upstream ink pinch valve 46 and the air pinch valve and the downstream ink pinch valve 49 are mounted on a front face of a rear wall 151 of the inkjet module 150. The recirculation pumps 40 and second controller 44 are mounted on a rear face of the rear wall 151. Accordingly, the pinch valves are positioned in close proximity to the printhead 4 in order to minimize ink drippage during printhead replacement.

The inkjet module 150 also includes a printhead capper and wiper (not visible in FIGS. 3 and 4), operated under the control of the second controller 44. The inkjet module 150 may be, for example, as described in Applicant's co-filed U.S. Provisional Application Ser. No. 63/348,445 filed Jun. 2, 2022, and entitled "INKJET MODULE WITH PRINTHEAD NEST ASSEMBLY", the contents of which are incorporated herein by reference.

A physically separate ink supply module 160 contains the aforementioned intermediary ink tank 100, pressure-control pump 120, ink filter 62, ink degasser 60, refill pump 30 and vacuum pump 64, as well as the first controller 107.

Figure 2:
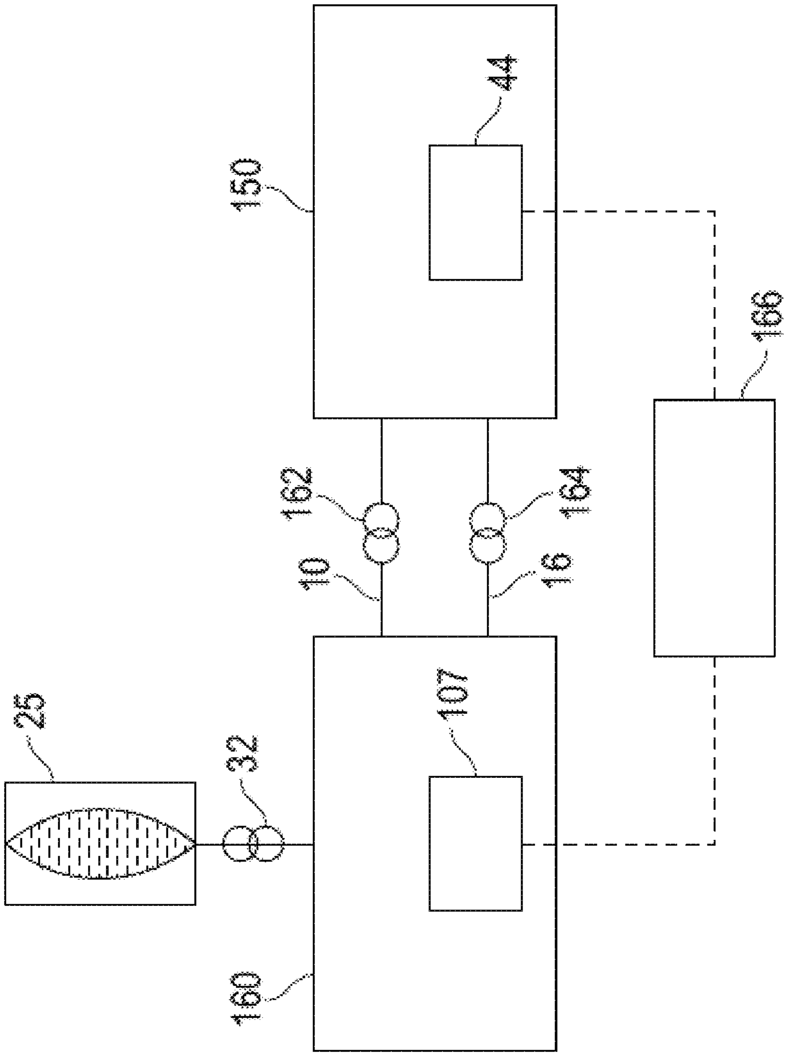
FIG. 2 shows schematically an ink delivery module connected to an inkjet module and bulk ink reservoir.

As best shown in FIG. 2, the ink supply module 160 is connected to the inkjet module 150 via an ink supply line coupling 162 in the ink supply line 10 and an ink return line coupling 164 in the ink return line 16, while the bulk ink reservoir 25 connects to the ink supply module 160 via the ink refill coupling 32. The first and second controllers 107 and 44 are each connected to a supervisor controller 166 to coordinate fluidic operations in the ink supply module 160 and inkjet module 150.

From the foregoing, it will be appreciated that the ink delivery system 1 shown in FIG. 1 provides a versatile range of fluidic operations, some of which are summarized below in Table 1. Of course, various combinations of these example fluidic operations may be employed.

TABLE 1

| Example Fluidic Operations | | | | | | | |
|---|---|---|---|---|---|---|---|
| Fluidic Operation | Upstream Ink Pinch Valve 48 | Air Pinch Valve 46 | Downstream Ink Pinch Valve 49 | First Bypass Valve 72 | Second Bypass Valve 74 | Ink Recirc. Pump 40 | Refill Pump 30 |
| PRINT | open | closed | open | closed | open | on | on |
| FILTER | open | closed | open | closed | open | on | off |
| DEPRIME | closed | open | open | open | closed | on | off |
| PRIME | open | closed | open | open | closed | on | off or on |
| NULL | closed | closed | closed | open | closed | off | off |

During normal printing ("PRINT" mode), ink is supplied to the printhead 4 from the intermediary ink tank 100 at a predetermined backpressure. In this mode, the ink recirculation pump 40 is on, the first bypass valve 72 is closed and the second bypass valve 74 is open to allow continuous degassing and filtering of ink as it circulates around the closed fluidic loop (clockwise as shown in FIG. 1). The first controller 107 receives feedback from the ink level sensor 130 and air pressure sensor 126 and coordinates operation of the ink refill pump 30 and pressure-control pump 120 (to the extent required) in order to maintain the predetermined backpressure at the printhead 4.

During certain idle periods ("FILTER" mode), ink is recirculated around the closed fluidic loop with the refill pump off. As with the PRINT mode, in the FILTER mode the ink recirculation pump 40 is on, the first bypass valve 72 is closed and the second bypass valve 74 is open to allow continuous degassing and filtering of ink as it circulates around the closed fluidic loop. This mode may be used to remove air bubbles from ink and/or filter ink in preparation for printing or during printhead wiping. During FILTER mode (and PRINT mode), the vacuum pump 64 is actuated so as to degas ink circulating around the closed fluidic loop and remove air bubbles from a surface of filter material in the ink filter 62.

In order to replace a spent printhead 4, it is necessary to deprime the printhead before it can be removed from the inkjet module 150 and replaced. In the "DEPRIME" mode, the air pinch valve 46 is open, the upstream ink pinch valve 48 is closed and the ink recirculation pump 40 is actuated to draw in air from atmosphere via the air intake line 50. A slug of air enters the closed fluidic loop via the ink supply line 10 and displaces ink from ink channels within the printhead 4. Once the printhead 4 has been isolated by closing the upstream and downstream ink pinch valves 48 and 49, the printhead can be safely removed from the inkjet module 150 without excess ink dripping from the first and second printhead couplings 3 and 5. The ink filter 62, and to a lesser extent the ink degasser 60, are vulnerable to excessive amounts of air contained in the return line 16 during printhead deprime operations. As foreshadowed above, excessive amounts of air cause undesirable foaming at the ink filter 62 as well as causing blockages in microscopic filter pores. Accordingly, the bypass line 72 is actuated for printhead depriming, whereby the first bypass valve 72 is opened, the second bypass valve 74 is closed and ink/air bypasses the ink degasser 60 and ink filter 62. This allows air introduced into the closed fluidic loop to be returned directly to the intermediary ink tank 100, whereupon air bubbles can float harmlessly into the headspace thereof. It is generally undesirable for unfiltered ink to enter the intermediary ink tank 100; however, this relatively small quantity ink was already filtered by the ink filter 62 upon entry into the closed fluidic loop from the bulk ink reservoir 25 and the benefits of protecting the ink filter generally outweigh the disadvantages of having unfiltered ink in the system. Moreover, the ink delivery system 1 will typically enter FILTER mode before any printing is recommenced using a replacement printhead 4.

As mentioned above, once a spent printhead 4 has been deprimed of ink, the ink delivery system 1 is set to "NULL" mode, which isolates the printhead from the ink supply, thereby allowing safe removal of the printhead with minimal ink spillages. A replacement printhead 4 may be installed with the ink delivery system maintained in its NULL mode.

In order to prime a replacement printhead 4, the ink delivery system enters "PRIME" mode from the NULL mode. In the PRIME mode, the air pinch valve 46 is closed and the upstream and downstream ink pinch valves 48 and 49 opened, while the pump 40 is actuated (clockwise as shown in FIG. 1) to circulate ink through the printhead. Priming of nozzles may be assisted via external suction on the nozzle plate 19 of the printhead 4 using, for example, a suction wiper. Initially on entering the PRIME mode, air may still be contained in the return line 16 following an earlier deprime. Accordingly, ink may be initially bypassed through the bypass line 70 by opening the first bypass valve 72 and closing the second bypass valve 74. Once the return line 16 (and bypass line 70) is cleared of air, ink may be directed once again through the ink degasser 60 and ink filter 62. In this way, the ink filter 62 is protected from excessive air bubbles, whilst enabling clean replacement of deprimed printheads.

It will, of course, be appreciated that the present invention has been described by way of example only and that modifications of detail may be made within the scope of the invention, which is defined in the accompanying claims.

The invention claimed is:

1. An ink delivery system for delivering ink to an inkjet printhead, the ink delivery system comprising:
- an ink tank;
- the inkjet printhead having a printhead inlet port and a printhead outlet port;
- an ink supply line connected between the ink tank and the printhead inlet port;
- an ink return line connected between the ink tank and the printhead outlet port;
- an ink recirculation pump positioned in the ink return line;
- an ink filter positioned in the ink return line;
- a bypass line for bypassing ink around the ink filter;
- one or more bypass valves for controlling flow of ink either through the ink filter or through the bypass line; and
- a controller for coordinating said bypass valves and said pump,
- wherein the controller is configured to pump ink from the printhead outlet port to the ink tank via the bypass line when the return line contains air.

2. The ink delivery system of claim 1, wherein the ink tank is configured for regulating a hydrostatic pressure of ink delivered to the printhead.

3. The ink delivery system of claim 1, wherein an ink degasser is positioned in the ink return line between the ink recirculation pump and the ink filter.

4. The ink delivery system of claim 1, wherein the bypass line bypasses ink around both the ink filter and the ink degasser.

5. The ink delivery system of claim 4, wherein the ink filter and the ink degasser are connected to a common vacuum pump for deaeration.

6. The ink delivery system of claim 1, wherein said one or more bypass valves comprises: a first bypass valve positioned in the bypass line and second bypass valve positioned in the ink return line.

7. The ink delivery system of claim 1, further comprising a bulk ink reservoir for connected to the ink return line for refilling the ink tank.

8. The ink delivery system of claim 1, further comprising an air intake line branched from the ink supply line, the air intake line enabling air to be introduced into the printhead for printhead depriming.

9. The ink delivery system of claim 8, wherein the air intake line and the ink supply line have respective pinch valves for controlling a supply of air or ink to the printhead.

10. The ink delivery system of claim 8, wherein the controller is configured to bypass ink around the ink filter via the bypass line whenever air is introduced into the ink delivery system via the air intake line.

11. The ink delivery system of claim 1, wherein the controller is configured to pump ink from the printhead outlet port to the ink tank via the ink filter during one or more fluidic operations selected from the group consisting of: (i) ink recirculation from the ink tank through the ink supply line and ink return line via the printhead; (ii) normal printing; and (iii) printhead priming.

12. The ink delivery system of claim 1, wherein the printhead is replaceable.

* * * * *